June 25, 1963
O. H. BANKER
3,095,011
VALVE
Filed Sept. 6, 1960
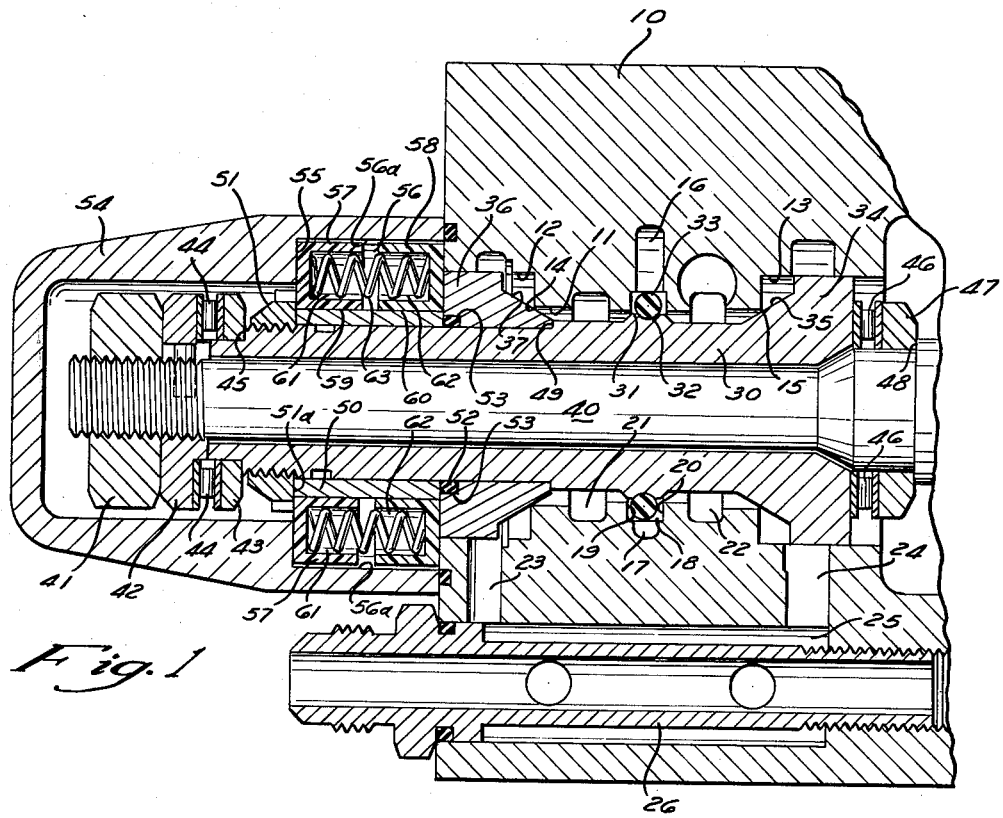
Fig. 1
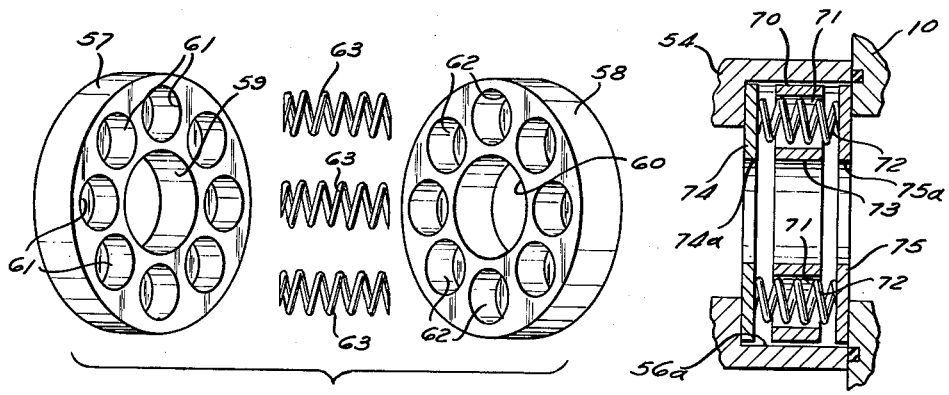
Fig. 2
Fig. 3
INVENTOR.
OSCAR H. BANKER
BY
RICHEY, McNENNY, & FARRINGTON
ATTORNEYS United States Patent Office 3,095,011
Patented June 25, 1963

3,095,011
VALVE
Oscar H. Banker, Bay Village, Ohio, assignor to Fawick Corporation, Cleveland, Ohio, a corporation of Michigan
Filed Sept. 6, 1960, Ser. No. 54,312
5 Claims. (Cl. 137—625.69)

This invention relates to a valve for actuating a manually controlled, fluid-operated device, such as in a power steering mechanism for an automotive vehicle.

In my United States Letter Patent Nos. 2,879,748 and 2,914,035, there have been disclosed and claimed valves of the "open center" type which are particularly well suited for use in actuating a double-acting piston and cylinder in a vehicle power steering mechanism. Prior to the present invention such valves have been provided with a single compression spring which biases the valve to the open-center, or neutral, position and whose biasing force must be overcome before the fluid-operated power steering mechanism can become effective. The biasing force exerted by this spring produces the initial opposing reaction or "feel" on the steering wheel which the driver senses manually as he begins to turn the steering wheel.

Depending upon the type of vehicle involved and the vehicle manufacturer's preference as to the "feel" which is considered desirable, the spring biasing force required may vary considerably from one vehicle to another. If only a single biasing spring were employed, as in the past, a substantial re-design of the power steering valve would be required to convert from one type of "feel" or reaction force to another, making it impossible to standardize the outside dimensions of such valves for a variety of different vehicles.

Another serious difficulty with such valves having a single biasing spring was that the valve became completely disabled if the spring broke.

The present invention is directed to a novel arrangement which avoids these difficulties, while at the same time retaining all of the advantages associated with the basic valve of my aforementioned patents.

In accordance with the present invention, the previously used single spring for biasing the valve to the open center, or neutral, position is replaced by a plurality of springs whose number may be selectively varied, so as to vary the biasing force, without requiring any modification of the rest of the valve. With this novel arrangement the spring bias on the valve may be readily adjusted to suit the design requirements of any particular vehicle. Moreover, even if one of the springs should break the valve would not become totally inoperative as a consequence. The present invention has the further advantages of lighter weight and more compact physical size.

Accordingly, it is an object of this invention to provide a novel and improved valve for actuating a manually controlled, fluid operated device.

Another object of this invention is to provide in such a valve a novel and improved spring bias arrangement for biasing it to its neutral position.

Another object of this invention is to provide a novel valve of this general type which will not be rendered totally inoperative if a bias spring should break.

Another object of this invention is to provide a novel valve of this type whose spring bias can be readily changed without requiring any change in the outside dimensions of the valve or any other substantial re-design of the valve.

Another object of this invention is to provide a novel valve of this type which, for a given load capacity, may be lighter and more compact than previous valves for the same use.

Further objects and advantages of this invention will be apparent from the following detailed description of a presently-preferred embodiment thereof which is illustrated in the accompanying drawing.

In the drawing:

FIGURE 1 is a fragmentary axial section through a valve incorporating the present invention;

FIGURE 2 is an exploded perspective view showing the novel spring biasing arrangement in the valve of FIG. 1; and FIGURE 3 is a fragmentary axial section showing an alternative biasing arrangement in accordance with the present invention.

Referring first to FIG. 1, the present invention is shown incorporated in a power steering valve which includes a valve body 10 having an axial bore 11 therein and enlarged counterbores 12 and 13 at the opposite ends of the bore 11. The valve body defines annular sharp corners 14 and 15 at the respective intersections between the counterbores and the bore 11. These corners define annular valve seats, as explained in greater detail hereinafter.

The valve body is formed with an inlet passage 16 which communicates with a round-bottomed groove 17 extending circumferentially around the valve bore 11. At the inside of this groove 17 there is an annular groove 18 of rectangular cross section which opens into the bore 11. The valve body presents a pair of axially spaced, radially extending, annular walls 19 and 20 at the opposite ends of groove 18. These walls define valve seats, as explained hereinafter.

On opposite sides of the groove 18 the valve body 10 is formed with annular grooves 21 and 22 which open into the bore 11 and which communicate with outlet passages (not shown) leading to respective opposite ends of the power cylinder in the power steering mechanism.

Also, the valve body is formed with fluid return passages 23 and 24, which lead from the counterbores 12 and 13, respectively, to a common passage 25 which leads into a fitting 26 connected to the fluid reservoir (not shown) for the power steering fluid.

The valve also includes a spool 30 which is mounted for relative axial movement with respect to the valve body 10 in either direction. To this end the valve body 10 and valve sleeve 30 may be connected in the steering system of a vehicle with one coupled to the front wheels of the vehicle and the other coupled to the steering wheel. The spool 30 is formed with an enlarged shoulder 31 having a circumferential groove 32 therein which receives an O-ring 33 of suitable rubber-like material. The major portion of the radial thickness of the O-ring 33 is disposed in the groove 18 in the valve body 10. From FIG. 1, it will be apparent that the axial thickness of the O-ring is substantially less than the axial spacing between the end walls 19 and 20 of the valve body groove 18.

At its right end in FIG. 1 the valve spool 30 is formed with an integral enlarged end flange 34 which has a sliding fit in the counterbore 13 in the valve body. Just inwardly from this end flange the spool 30 presents a tapered surface 35 for engagement against the valve seat 15 when the spool 30 is actuated to the left in FIG. 1.

The spool 30 also carries flange member 36 which is slidably received in the counterbore 12 in the valve body. This flange member presents a tapered surface 37 for engagement with the valve seat 14 when the spool 30 is moved to the right in FIG. 1.

A rod 40 is suitably coupled to the spool 30 and the flange member 36 is coupled to the spool 30 so that the rod 40, spool 30 and flange member 36 move as a unit.

At its left end in FIG. 1 the rod 40 is externally screw-threaded to receive a nut 41. A pair of thrust plates 42 and 43, separated by roller bearings 44, are engaged between nut 41 and an external annular shoulder 45 on valve spool 30. At the right end of the valve spool 30, roller bearings 46 are engaged between the end of the spool and a thrust plate 47 seated against an annular external shoulder 48 on the rod 40. With this arrangement when the rod 40 is moved axially in either direction the valve spool 30 moves in unison with it.

The flange member 36 on valve spool 30 is engaged between an annular external shoulder 49 on the spool and the right end of a sleeve member 50 which is mounted on valve spool 30. With this arrangement the flange member 36 moves as a unit with valve spool 30 in either direction of the latter's movement.

FIG. 1 illustrates the open-center or neutral position of the valve, in which the O-ring 33 is positioned midway between the end walls 19 and 20 of the groove 18 in the valve body, the conical surface 37 on the flange member 36 carried by spool 30 is spaced away from engagement with the valve seat 14, and the conical surface 35 on the end flange 34 of spool 30 is similarly spaced away from engagement with the valve seat 15. At this time the incoming fluid at 16 is free to flow around the O-ring 33, on either side thereof, into the bore 11 in the valve body and past the respective valve seats 14 and 15 to the fluid return passages 23 and 24 leading to the reservoir, preventing the build up of pressure in either outlet passage 21 or 22.

When the rod 40 is actuated to left in FIG. 1 the O-ring 33 seats against the end wall 19 of valve body groove 18 and the conical surface 35 on the spool 30 approaches the valve seat 15. Consequently, fluid pressure builds up in the outlet passage 22, while the other outlet passage 21 is blocked from communication with the inlet.

Conversely, when the rod 40 is actuated to the right in FIG. 1, the O-ring first seats against the end wall 20 of valve body groove 18 and thereafter the conical surface 37 on the flange member 36 carried by spool 30 approaches the valve seat 14. Fluid pressure now builds up in the outlet passage 21, while the other outlet passage 22 is blocked from communication with the inlet passage 16.

The valve as thus far described operates in accordance with the principles of my earlier U.S. Patents 2,879,748 and 2,914,035, previously mentioned.

In accordance with the present invention there is provided a novel spring biasing arrangement for biasing the valve spool 30 to its open center or neutral position, as shown in FIG. 1. Since this spring biasing arrangement opposes the movement of the valve spool 30 in either direction away from this open-center position, it will be evident that the force exerted by this biasing spring arrangement determines the initial "feel" on the steering wheel (i.e., the manual force which must be exerted on the steering wheel when it is first turned). Also, together with the reaction produced by the front wheels of the vehicle, it also determines the steering wheel reaction during power steering of the vehicle. The present invention enables this reaction force or "feel" to be selectively varied over a considerable range of values without requiring any change in the valve except the addition or removal of one or more springs. Most important, no change in the outside dimensions of the valve is required to effect this change.

Referring to FIG. 1, the sleeve member 50 is mounted on the outside of the valve spool 30 beyond the end flange member 36 thereon. At its left end in FIG. 1 the sleeve member 50 is engaged by a nut 51 threadedly mounted on valve spool 30. Nut 51 presents an axially facing annular shoulder 51a at this end of sleeve member 50. At its opposite end the sleeve member 50 engages the flange member 36. An O-ring 52 is seated in an internal groove 53 formed in this end of the flange member 36. A valve housing end cap 54 is detachably mounted on the valve body 10 and together with the valve body constitutes the valve housing means in the present invention. The end cap 54 presents an annular, axially facing internal shoulder 55 which is in radial alignment with the shoulder 51a on nut 51. The outside of the sleeve member 50 and the inside of the end cap 54 together define an annular space 56 which extends from these aligned shoulders 51a and 55 axially to the right in FIG. 1 up to the outer end faces of the valve body 10 and the flange member 36 on the valve spool 30. The novel biasing arrangement of the present invention is mounted in this annular space.

In the embodiment shown in FIGS. 1 and 2 the novel spring biasing arrangement of the present invention comprises a pair of confronting annular members 57 and 58, which preferably are of nylon, Teflon, polyethylene or other suitable plastic material. Members 57 and 58 together constitute the spring retainer means in the present invention. They are slidably received within the annular space 56 and have a substantial radial clearance from the annular inside wall 56a of the end cap 54 which extends around this space. These annular members are formed with central axial bores 59 and 60, respectively, for slidable engagement with the outside of the sleeve member 50.

As shown in FIG. 2, the annular member 57 is formed with a plurality of inwardly facing cylindrical recesses 61 arranged in a circular series around the axis of the bore 59. Each of these recesses 61 is open at the axially inward end of the member 57 and is closed at the latter's axially outward end.

The other annular member 58 is similarly formed with an identical group of open-ended recesses 62, each of which is open at the axially inward end of the member 58 and is closed at its axially outward end. Preferably, the annular members 57 and 58 are identical so that they may be made in the same mold.

The corresponding pairs of recesses 61, 62 are positioned in axial alignment with each other to receive the opposite ends of corresponding individual coil springs 63. In addition to acting as a spring retainer, the annular members 57 and 58 also act as end washers for the springs.

As shown in FIG. 1, the springs 63 are under compression and force the respective members 57 and 58 away from each other, with the outer end of the member 57 engaging the internal shoulder 55 on the housing end cap 54 and the shoulder 51a on nut 51, while the outer end of the member 58 abuts against the end of the valve body 10 and the outer end of the end flange member 36 carried by the valve spool 30. In one practical embodiment the adjacent ends of the members 57 and 58 are spaced apart axially from one another a distance of approximately .080 inch in the neutral or open-center position of the parts shown in FIG. 1.

From FIG. 1 it will be apparent that the springs 63 positively bias the valve spool 30 to the open center or neutral position. The biasing force which these springs exert depends upon the number of springs used. Ordinarily, the number of springs required will be less than the number of paired recesses 61, 62 in the members 57 and 58, so that some of these paired recesses will be empty. Preferably, the springs are more or less evenly distributed around the axis of the valve so as not to tend to tilt the members 57 and 58. In order to increase or decrease the spring bias, all that is necessary is to insert or remove one or more springs 63 so as to get the biasing effect desired. This change may be effected readily, simply by detaching the housing end cap 54 and then making the desired change in the number of springs used. No basic redesign of the valve is required, nor is it necessary to change the outside dimensions of the valve in order to make such changes.

Another advantage of the present arrangement is that the valve does not become totally defective in the event that one of the springs 63 should break. If this should happen, it would change the biasing force exerted by the springs, but it would not mean that the valve is no longer biased to its neutral or open-center position. It would simply mean that the reaction or "feel" on the steering wheel would be less than intended.

Another advantage of the arrangement shown in FIG. 1 is that both of the annular members 57 and 58 have long-span sliding contact of substantial extent at their respective bores 59 and 60 with the outside of the sleeve member 50. For this reason there is no tendency for either of these members to become tilted so as to be likely to be jammed.

In the operation of the valve, when the relative movement between valve body 10 and rod 40 is such that rod 40 moves to the right in FIG. 1, the sleeve member 50, nut 51 and the flange member 36 move to the right in unison with it and the valve spool 30. Nut 51 moves the annular member 57 to the right, while the other annular member 58 stays seated against the end wall of the valve body 10. Consequently, the bias springs 63 become more compressed.

When the actuating force on rod 40 is removed the bias springs 63 return the parts to the position shown in FIG. 1.

Conversely, when the relative movement between valve body 10 and rod 40 is such that rod 40 moves to the left in FIG. 1, carrying with it the valve sleeve 30, the sleeve member 50, nut 51 and the flange member 36 also move to the left. This causes the annular member 58 to move to the left while the other annular member 57 remains seated against the internal annular shoulder 55 on the valve housing end cap 54. Consequently, the bias springs 63 become more compressed.

When the actuating force on rod 40 is relieved, these springs return the parts of the valve to the position shown in FIG. 1.

FIGURE 3 shows an alternative biasing arrangement which may be used in place of the arrangement shown in FIG. 2. In this alternative arrangement a cylindrical spring retainer body 70 is formed with a plurality of angularly spaced through openings 71 for receiving coil springs 72. Each of these openings extends parallel to the axis of the valve. The body 70 is formed with a central opening 73 for long-span sliding contact with the sleeve member 50. The outer periphery of body 70 has a substantial radial clearance from the inside wall 56a of the valve housing end cap 54. Flat annular washers 74 and 75 engage the opposite ends of the springs 72. These washers have central openings 74a and 75a, respectively, for slidably receiving the sleeve member 50. The outer peripheries of these washers have substantial radial clearances from the inside wall 56a of the housing end cap 54.

In the neutral, open center position the springs 72 bias the washer 74 against the shoulders 55 and 51a and bias the washer 75 against the ends of valve body 10 and flange member 36.

When the relative movement between valve body 10 and rod 40 is such that rod 40 moves to the right in FIG. 3, the nut 51 moves washer 74 to the right while the other washer 75 stays seated against the end wall of valve body 10.

Conversely, when the relative movement between valve body 10 and rod 40 is such that rod 40 moves to the left in FIG. 3, the flange member 36 moves washer 75 to the left while the other washer 74 stays seated against the internal shoulder 55 on the end cap 54 of the valve housing.

In this embodiment, as in the first-described embodiment, the biasing force which the springs exert on the valve spool may be selectively varied, simply by changing the number of springs. Ordinarily, the number of springs 72 which are used will be less than the number of openings 71, so that some of these openings will be empty.

It is to be understood that while there have been described herein and illustrated in the accompanying drawing two particular, presently-preferred embodiments of this invention, various modifications, omissions and refinements which depart from the disclosed embodiments may be adopted without departing from the spirit and scope of this invention.

What is claimed is:

1. In a valve, valve housing means defining flow passages, a slidable valve unit in said valve housing means, said valve housing means and said slidable valve unit being relatively movable with respect to one another in opposite directions from a neutral position of said slidable valve unit in said valve housing means to control the flow of fluid through said flow passages, said valve housing means defining an annular space which is disposed completely to one side axially of said flow passages and which extends circumferentially completely around said slidable valve unit, said valve housing means at the opposite axial ends of said annular space presenting a pair of oppositely facing, radially disposed, annular walls, annular spring reaction means in said annular space, said last-mentioned means comprising a pair of annular members relatively slidable axially with respect to said valve housing means and with respect to said slidable valve unit, one of said annular members being mounted to remain stationary with respect to said slidable valve unit and the other of said annular members being mounted to remain stationary with respect to said valve housing means in one direction of the relative movement between said valve housing means and said slidable valve unit from said neutral position, said one annular member being mounted to remain stationary with respect to said valve housing means and said other annular member being mounted to remain stationary with respect to said slidable valve unit in the opposite direction of the relative movement between said valve housing means and said slidable valve unit from said neutral position, said annular spring reaction means also having a plurality, greater than two, of separate, axially extending spring recesses which are spaced apart in succession circumferentially about said slidable valve unit, and individual springs removably received in said recesses and under compression between said annular members and biasing the latter against said walls to thereby bias said slidable valve unit to said neutral position.

2. The valve of claim 1 wherein said spring recesses are aligned, axially inwardly-facing recesses formed in said annular members.

3. The valve of claim 2 wherein each of said annular members has a long-span sliding support of substantial axial extent in said annular space.

4. The valve of claim 1 wherein said annular members are flat washers, and wherein there is provided an annular spring retainer body between said washers which has through openings defining said spring recesses.

5. In a valve, a valve body having flow passages therein, a slidable valve unit in said valve body projecting axially beyond one end of said body, said valve unit being slidable in said valve body in opposite directions from a neutral position to control the flow of fluid through said flow passages, a hollow end cap detachably secured to said valve body at said one end thereof, said end cap receiving the projecting end of said slidable valve unit and providing an annular space extending circumferentially completely around the latter, said one end of the valve body presenting a radially disposed annular wall which defines one axial end of said annular space, said end cap presenting a radially disposed annular wall spaced axially from said one end of the valve body and defining the opposite axial end of said annular space, annular spring reaction means in said annular space, said spring reaction means comprising a pair of annular members relatively slidable axially with respect to said valve body and end cap and with respect to said slidable valve unit, one of said annular members being mounted to remain stationary with respect to said slidable valve unit and the other of said annular members being mounted to remain stationary with respect to said valve body in one direction of movement of said slidable valve unit from said neutral position, said one annular member being mounted to remain stationary with respect to said valve body and said other annular member being mounted to remain stationary with respect to said slidable valve unit in the opposite direction of sliding movement of said slidable valve unit from said neutral position, said annular spring reaction means also having a plurality, greater than two, of separate, axially extending spring recesses which are spaced apart in succession circumferentially about said slidable valve unit, and individual springs removably received in said recesses and engaged under compression between said annular members and biasing the latter in opposite axial directions against said annular walls respectively to thereby bias said slidable valve unit to said neutral position.

References Cited in the file of this patent

UNITED STATES PATENTS

| | | |
|---|---|---|
| 1,605,399 | Fornaca | Nov. 2, 1926 |
| 1,753,024 | Rode | Apr. 1, 1930 |
| 2,824,314 | Davis | Feb. 25, 1958 |
| 2,879,748 | Banker | Mar. 31, 1959 |
| 2,914,035 | Banker | Nov. 24, 1959 |
| 2,997,064 | Gerwig et al. | Aug. 22, 1961 |

FOREIGN PATENTS

| | | |
|---|---|---|
| 823,924 | Great Britain | Nov. 18, 1959 |